(12) United States Patent
Brinkman

(10) Patent No.: US 8,788,538 B2
(45) Date of Patent: Jul. 22, 2014

(54) NAVIGATION OF HIERARCHICAL DATA USING CLIMB/DIVE AND SPIN INPUTS

(75) Inventor: Donald Brinkman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 107 days.

(21) Appl. No.: 13/313,031

(22) Filed: Dec. 7, 2011

(65) Prior Publication Data

US 2013/0151564 A1 Jun. 13, 2013

(51) Int. Cl.
*G06F 17/30* (2006.01)

(52) U.S. Cl.
CPC ............................. *G06F 17/30961* (2013.01)
USPC ...................................................... 707/797

(58) Field of Classification Search
USPC ....................................................... 707/797
See application file for complete search history.

(56) References Cited

U.S. PATENT DOCUMENTS

| | | | |
|---|---|---|---|
| 7,038,680 B2 | 5/2006 | Pitkow | |
| 7,523,126 B2 | 4/2009 | Rivette et al. | |
| 2002/0032696 A1* | 3/2002 | Takiguchi et al. | 707/500.1 |
| 2002/0191452 A1* | 12/2002 | Fujihara | 365/200 |

OTHER PUBLICATIONS

Hinze et al., Type-Indexed Data Types, MPC 2002, LNCS 2386, published 2002, pp. 148-174.*

Admiraal, "Automated ANTLR Tree walker Generation", Retrieved at <<http://fmt.cs.utwente.nl/files/sprojects/23.pdf>>, University of Twente, Jan. 25, 2010, pp. 140.

Munzner, "TreeJuxtaposer: Scalable Tree Comparison using Focus+Context with Guaranteed Visibility", Retrieved at <<http://citeseerx.ist.psu.edu/viewdoc/download?doi=10.1.1.122.5735&rep=rep1&type=pdf>>, Siggraph Acm, vol. 22, No. 3, Jul. 2003, pp. 453-462.

Huet, "Functional Pearl The Zipper", Retrieved at <<http://www.st.cs.uni-saarland.de/edu/seminare/2005/advanced-fp/docs/huet-zipper.pdf>>, J. Functional Programming, vol. 7 (5), Sep. 9, 1997, pp. 549-554.

Karstens, "Visualization of Complex Structures on Mobile Handhelds", Retrieved at <<http://citeseerx.ist.psu.edu/viewdoc/download?doi=10.1.1.112.1960&rep=rep1&type=pdf>>, Proceedings of International Workshop on Mobile Computing, 2003, pp. 8.

Neumann, "ArcTrees: Visualizing Relations in Hierarchical Data", Retrieved at <<http://citeseerx.ist.psu.edu/viewdoc/download?doi=10.1.1.73.1055&rep=rep1&type=pdf>>, Proceedings of the Eurographics / IEEE VGTC Symposium on Visualization (EuroVis), 2005, pp. 9.

"Hyperbolic tree", Retrieved at <<http://en.wikipedia.org/wiki/Hyperbolic_tree>>, 2010, pp. 2.

(Continued)

*Primary Examiner* — Jensen Hu

(74) *Attorney, Agent, or Firm* — Carole Boelitz; Micky Minhas

(57) ABSTRACT

A navigation mechanism for hierarchical data uses a climb/dive and rotate inputs to traverse a hierarchical dataset. The hierarchical dataset may be arranged in a filial-heir arrangement for easy traversal. The navigation mechanism may be used with several different ways of displaying the data, some of which may display both overall context and detailed view of the data. One such example may have a context section and a detail section, where the context section may present the overall context of a focus node in relation to the overall dataset and the detail section may display other nodes that are at the same or lower level than the focus node.

20 Claims, 6 Drawing Sheets

(56) References Cited

OTHER PUBLICATIONS

"Treemapping", Retrieved at <<http://en.wikipedia.org/wiki/Tree_map>>, Retrieved Date: Aug. 23, 2011, pp. 4.
Robertson, et al., "Cone Trees", Retrieved at <<httRetrievedp://www.infovis-wiki.net/index.php?title=Cone_Trees>>, Retrieved Date: Aug. 23, 2011, pp. 4.
"Treemap filesystem visualizer", Retrieved at <<http://www.jam-software.com/treesize/index.shtml.>>, Retrieved Date: Aug. 23, 2011, p. 1.
Shneiderman, Ben, "Discovering Business Intelligence Using Treemap Visualizations", Retrieved at <<http://www.perceptualedge.com/articles/b-eye/treemaps.pdf>>, Apr. 11, 2006, pp. 1-9.

* cited by examiner

NAVIGATION OF HIERARCHICAL DATA USING CLIMB/DIVE AND SPIN INPUTS

BACKGROUND

Visualizing and navigating large datasets is difficult to give users both context and detail of the data. Some visualization schemes may present vast amount of data, but provide little detail. Other visualization schemes may present details of a large dataset, but fail to give a user context in which the details are being extracted.

SUMMARY

A navigation mechanism for hierarchical data uses a climb/dive and rotate inputs to traverse a hierarchical dataset. The hierarchical dataset may be arranged in a filial-heir arrangement for easy traversal. The navigation mechanism may be used with several different ways of displaying the data, some of which may display both overall context and detailed view of the data. One such example may have a context section and a detail section, where the context section may present the overall context of a focus node in relation to the overall dataset and the detail section may display other nodes that are at the same or lower level than the focus node.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
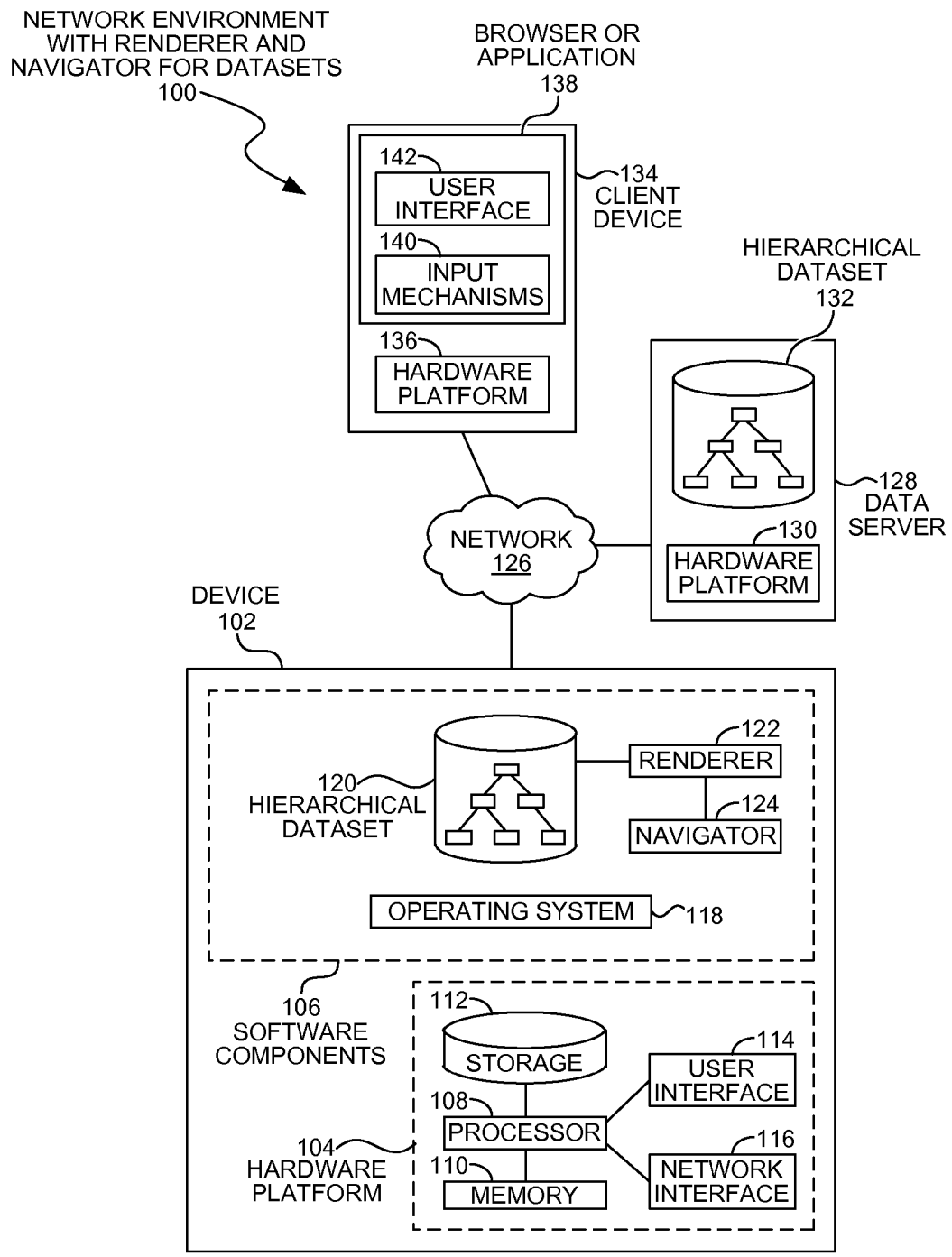
FIG. 1 is a diagram of an embodiment showing a network environment with a renderer and navigator for hierarchical datasets.

A hierarchical dataset may be navigated using a set of inputs that include climb/dive and spin directions. The climb/dive inputs may traverse the hierarchical dataset in the parent/child direction, while the spin input may traverse the hierarchical dataset in the sibling direction.

The dataset may be rendered on a user interface during the navigation in various manners. In many cases, the dataset may be rendered so that the context of the current focus node may be shown, along with the details of other nodes nearby the focus node.

In one rendering, the hierarchical dataset may be rendered with a detail portion and a context portion. The detail portion may show sibling and subordinate nodes, which may allow a user to explore the dataset on a detailed level. The context portion may show various parent, grandparent, and other ancestor nodes that show a context in which the current focus node exists. The depiction of ancestor nodes may contain local context such as local siblings and subordinates.

In some such embodiments, the context portion of the rendering may be some form of a zipper tree and the detail portion may be a hierarchical view of a portion of the dataset with the current focus node as the root node. Some embodiments may display the hierarchical view as a filial-heir view. The combination of a detail portion and a context portion may help users explore the details of a dataset without losing sight of their overall location in the dataset. When combined with an animated rendering system, the navigation and rendering system may be an intuitive and efficient mechanism for exploring deep and complex hierarchical datasets.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100, showing a device 102 that may present hierarchical datasets in an interactive user interface. Embodiment 100 is an example of a network environment where one or more devices may interact to render and navigate a hierarchical dataset.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 illustrates hardware and software components that may be used to render and navigate a hierarchical dataset. The navigation may be performed using climb/dive and spin inputs, where the climb/dive input moves up or down through the hierarchical tree and the spin input cycles through available child nodes.

The rendering of the dataset may have a focus node that may change as a user browses or navigates the dataset. The focus node may contain data, links, or metadata that may be displayed or accessed through a user interface during a browsing session in some embodiments. In many embodiments, a user may navigate through the hierarchical dataset to access data stored at various nodes in the dataset.

The navigation mechanism may traverse a hierarchical dataset using a filial-heir representation of the data. A filial-heir representation of the data may be a binary representation of a conventional hierarchical dataset, where the user may be able to navigate across child nodes using the spin input or up and down the hierarchy using the climb/dive input.

In some embodiments, some or all of the hierarchical dataset may be converted into a filial-heir data structure for use in navigation. Some embodiments may analyze a hierarchical dataset to create a filial-heir representation of the data for navigation only. In other embodiments, the hierarchical dataset may not be converted.

The rendering may be performed using a detail portion and context portion of a user interface. The detail portion may contain child nodes, grandchild nodes, and other nodes that are below or subordinate to the level of the current focus node. The detail portion may also contain sibling nodes as well as nodes that are subordinate to the siblings. The context portion may contain nodes that are not in the detail portion. Such nodes may include parent nodes, grandparent nodes, and others that may be direct ancestors as well as nodes subordinate to those ancestors. The context portion of the user interface may give the user a visual sense of how the focus node relates to the entire dataset. In many embodiments, the context portion may show several generations of ancestor nodes, for example.

The system of embodiment 100 may have several different architectures. In a simple embodiment, the hierarchical dataset, renderer, and navigation system may reside on a single device. In such an architecture, all of the data, computation, rendering, and input may be performed on a single device which may or may not be connected to other devices.

In some architectures, one device may provide the data, while another device may perform the computation, rendering, and input capture. In such an architecture, the data may be remotely hosted or maintained.

In a third architecture, a client device may display the rendered user interface and capture user inputs, while a second device performs some or all of the computation and image generation. The second device may or may not contain the hierarchical dataset, which may be provided by a third device. In such an architecture, the client device may display an image created by and defined by the second device. In one example, the second device may create an HTML definition or other definition of the image that may be displayed by the client device.

The various architectures are merely examples of the architecture that may be used for different applications. In the case where the user has a device with little computational power or data storage, such as a cellular telephone, a client/server architecture may be appropriate. In the case where the data are stored locally, a single device architecture may be appropriate.

The graphical renderings of the hierarchical dataset may be done in many different manners. In this specification, several examples of renderings may be found. Each of the examples are merely different mechanisms to display a hierarchical dataset and are not meant to be an exhaustive list of examples. The navigation mechanism may be applied to any rendering of a hierarchical dataset.

The system of embodiment 100 is illustrated as being contained in a single device 102. The device 102 may have a hardware platform 104 and software components 106.

The device 102 may represent a server or other powerful computer system. In some embodiments, however, the device 102 may be any type of computing device, such as a personal computer, game console, cellular telephone, netbook computer, or other computing device. Some embodiments may use a group of devices to implement the functions of the device 102. For example, the device 102 may be implemented within a datacenter where the hardware platform 104 comprises many computer devices and the software component are implemented as stateless or stateful processes that operate on the hardware platform.

The hardware platform 104 may include a processor 108, random access memory 110, and nonvolatile storage 112. The processor 108 may be a single microprocessor, multi-core processor, or a group of processors. The random access memory 110 may store executable code as well as data that may be immediately accessible to the processor 108, while the nonvolatile storage 112 may store executable code and data in a persistent state.

The hardware platform 104 may include user interface devices 114. The user interface devices 114 may include keyboards, monitors, pointing devices, and other user interface components.

The hardware platform 104 may also include a network interface 116. The network interface 116 may include hardwired and wireless interfaces through which the system 102 may communicate with other devices.

Many embodiments may implement the various software components using a hardware platform that is a cloud fabric. A cloud hardware fabric may execute software on multiple devices using various virtualization techniques. The cloud fabric may include hardware and software components that may operate multiple instances of an application or process in parallel. Such embodiments may have scalable throughput by implementing multiple parallel processes.

The software components 106 may include an operating system 118 on which various applications may execute. In some cloud based embodiments, the notion of an operating system 118 may or may not be exposed to an application.

The device 102 may contain a hierarchical dataset 120 which may be displayed by a renderer 122 and navigated using a navigator 124. The renderer 122 may analyze the hierarchical dataset 120 and display the dataset using a current focus node. The navigator 124 may allow a user to change the focus node and navigate through the hierarchical dataset. As the user changes the focus node and traverses the dataset, the renderer 122 may update the user interface showing the dataset.

In many embodiments, the renderer 122 may animate the changes of the display as the user navigates using the navigator 124. For example, the user may select a parent node and the hierarchical dataset may shift so that the focus node changes to the parent node. The animation may be a feedback mechanism that lets the user know how their inputs are being interpreted and lets the user experience movement through the hierarchy.

The device 102 may be connected to a network 126 to various other devices, such as a data server 128 and a client device 134.

Some embodiments may have a data server 128 which may provide the data consumed by the device 102. The data server 128 may have a hardware platform 130 on which a database application may execute. The data server 128 may have a hierarchical dataset 132 that may be consumed by the renderer 122 of the device 102.

The data server 128 may be an example of a remotely located data source that may be browsed by the renderer 122 and navigator 124 of the device 102.

A client device 134 may be used in some embodiments to display and capture user input. The client device 134 may represent an embodiment where a user's device may provide the user experience, but the device 102 may perform much of the computational and analysis activities. In many such embodiments, an image, markup language, or other rendering of a user interface may be created by the device 102 and transmitted over the network 126 to be displayed on the client device 134.

The client device 134 may have a hardware platform 136 and a browser or application 138 which may capture user input using various input mechanisms 140 and display the rendered dataset in a user interface 142.

Figure 2:
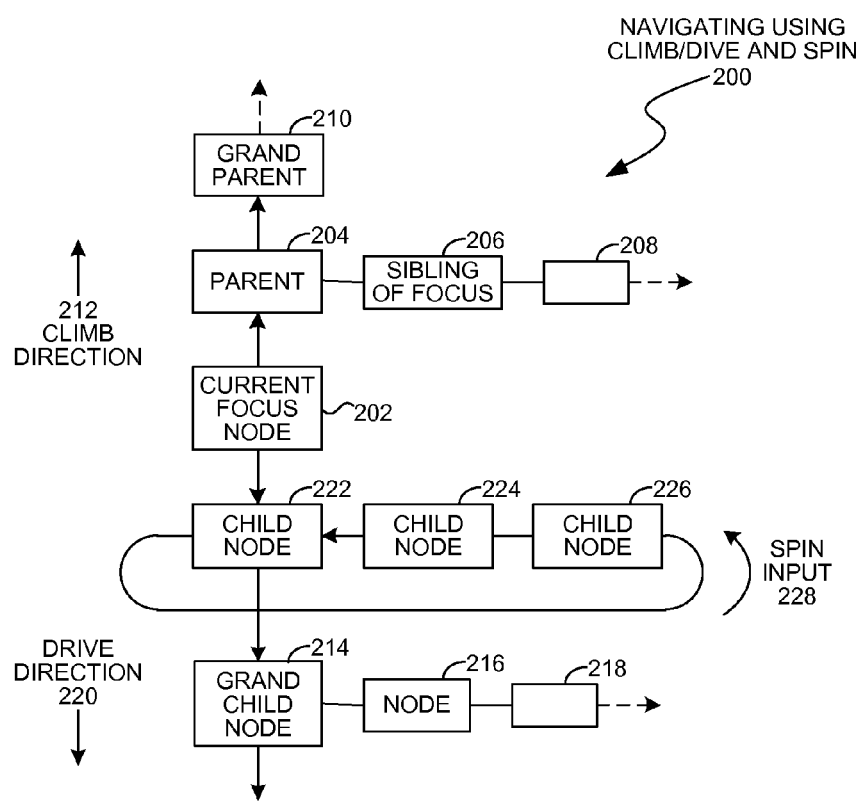
FIG. 2 is a diagram illustration of an example embodiment showing a mechanism for displaying and navigating a dataset.

FIG. 2 is a diagram illustration of an example embodiment 200 showing a hierarchical data structure and navigating the data structure. Embodiment 200 illustrates merely one example of a user interface and the usage of climb/dive and spin user inputs for navigating the dataset.

Embodiment 200 shows a portion of a hierarchical dataset. The current focus node 202 is displayed in the relative center of the image. Above and below the current focus node 202 are nodes that have a parent/child relationship with each other.

Above the current focus node 202 are a parent node 204 and a grandparent node 210. Below the current focus node 202 are a child node 222 and grandchild node 214.

The user may navigate up and down the chain of parent/child relationships by climbing or diving. The climb direction 212 indicates that the user wishes to go up the chain of parent/child relationships. A single step in the climb direction may make the parent node 204 the new current focus node 204. Similarly, a downward step may make the child node 222 the new current focus node 204.

When a new current focus node is selected, that node may be moved to the position of the current focus node 202. In many embodiments, the image may move with animation, so that the user recognizes that they are moving through the hierarchy.

In the display, the parent node 204 may be shown with nodes 206 and 208. Nodes 206 and 208 may be siblings of the parent node 204. In the rendering of the dataset, the nodes 206 and 208 may be shown as increasingly smaller node sizes. Even though the nodes 204, 206, and 208 are at the same level as each other, the decreasing size of nodes 206 and 208 may allow the rendering to display many nodes on the same level while highlighting only a few of the nodes.

Similarly, the child nodes 222, 224, and 226 may be shown as having decreasing size or visual importance. The spin operation may cycle through the various child nodes in order. Some embodiments may have a single spin direction 228, while other embodiments may allow a user to spin in either direction.

The child nodes 222, 224, and 226 may be cycled through using the spin input until a desired child node is highlighted. The child node 222 is the current child node, and changing to a different child node will cause the new child node to be made the current child node.

In the display of embodiment 200, sibling nodes may be illustrated as having different sizes or visual importance, even though the sibling nodes reside on the same level of a hierarchy and are similarly related to each other. The different sizes may highlight a current node as well as the nodes that are displayed next to the current node. When the user moves to a sibling node, that node may be made the current sibling node and other nodes may be highlighted.

The order of the sibling nodes may or may not be sorted when presenting sibling nodes. In some embodiments, the sibling nodes may have a logical order, such as nodes that relate to each month of the year. In such cases, the sibling nodes may be sorted prior to presentation and the user may spin through the nodes in the logical order. In other cases where there may not be a logical order to the sibling nodes, the nodes may be presented in the order in which they were created or some other order.

The order of the sibling nodes may be determined when the data are displayed. In many cases, the ordering may be derived from data or metadata. Examples of the metadata may include size, creation date, file name, etc. In some embodiments, the sibling nodes may be clustered together with similar nodes.

Embodiment 200 shows an abbreviated version of a rendered display. In many versions, there may be some representation of other nodes in the hierarchy. For example, the node 206 may be shown with a set of child nodes, as well as nodes 224 or 226. Some embodiments may hide such extra nodes as adding to the clutter of the display.

The navigation of the hierarchical dataset may be performed with climb/dive and spin inputs. For example, a user may wish to visit node 218. In order to traverse to node 218, the user may dive to set node 222 as the current focus node 202. When node 222 is set as the current focus node, the grandchild node 214 may be presented as the child node 222, and nodes 216 and 218 may be presented as child nodes 224 and 226. The user may then use the spin input to step through the various child nodes until the desired node 218 is the current child node. The user may then traverse downward using the dive input to select node 218 as the current focus node.

When a node is selected as the current focus node 202, the user may be able to interact with the node. If the node contains data, metadata, links, or other information, that information may be displayed or the user may be able to access the information.

Embodiment 200 may be separated into a detail portion and a context portion. The portion of the rendering above the current focus node 202 may be considered the context portion of the rendering, and the portion of the rendering below the current focus node 202 may be considered the detail portion.

The context portion of the rendering may be designed to show the user an overall context within the larger scope of the entire hierarchical dataset. While each embodiment may show the context in different manners, the context portion may visually show the user higher levels within the hierarchy so that the user can comprehend their location.

The detail portion of the rendering may show further details of the dataset. In many embodiments, the user may spend much of their time browsing in the details portion of the user interface with occasional moves upward into the context portion. Some embodiments may devote half of the user interface real estate to the details portion and half to the context portion, while other embodiments may have more than half of the real estate dedicated to the details portion and less to the context portion.

Figure 3:
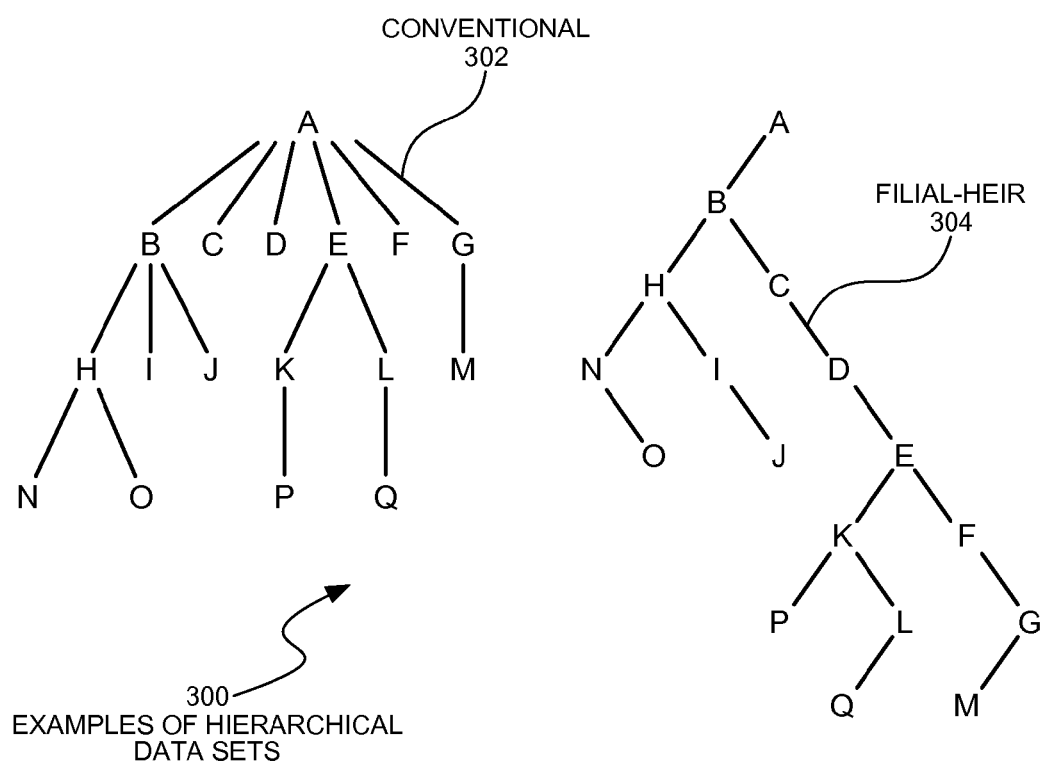
FIG. 3 is a diagram illustration of an example embodiment showing a hierarchical dataset in both conventional and filial-heir configurations.

FIG. 3 is a diagram illustration of an embodiment 300 showing two examples of hierarchical datasets. A conventional dataset 302 is displayed with a filial-heir representation 304 of the same dataset. The filial-heir representation 304 shows the same data from the conventional dataset 302 but converted to a binary tree.

The conventional dataset 302 may contain multiple children for each node. For example, node A has child nodes B, C, D, E, F, and G. Navigating such a dataset may be difficult. Such a dataset may be generalized as an n-ary tree.

However, when the same dataset is converted to a filial-heir representation 304, the navigation of climb/dive and spin may be implemented. The climb/dive direction may allow a user to traverse upwards and downwards through the hierarchy, while the spin direction may traverse across siblings.

In order to traverse from node A to node Q using the filial-heir representation 304, the user may begin at node A, traverse down to node B, across to node E, down to node K, across to node L, and down to node Q. There may be several operations to navigate through the dataset, but the entire navigation may be performed with merely two simple user inputs. Such simple user inputs may be especially useful for small, handheld devices that do not have keyboards or pointing equipment.

In some embodiments, a hierarchical dataset may be converted to a filial-heir dataset for use with a navigation and rendering system. In some embodiments, a filial-heir representation of the dataset may be constructed for the navigation and rendering system. In still other embodiments, no filial-heir representation may be created.

Figure 4A:
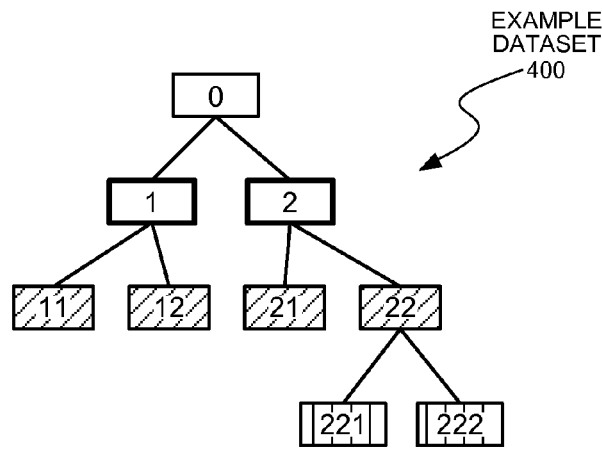
FIG. 4A is a diagram illustration of an example embodiment showing a hierarchical dataset.
Figure 4B:
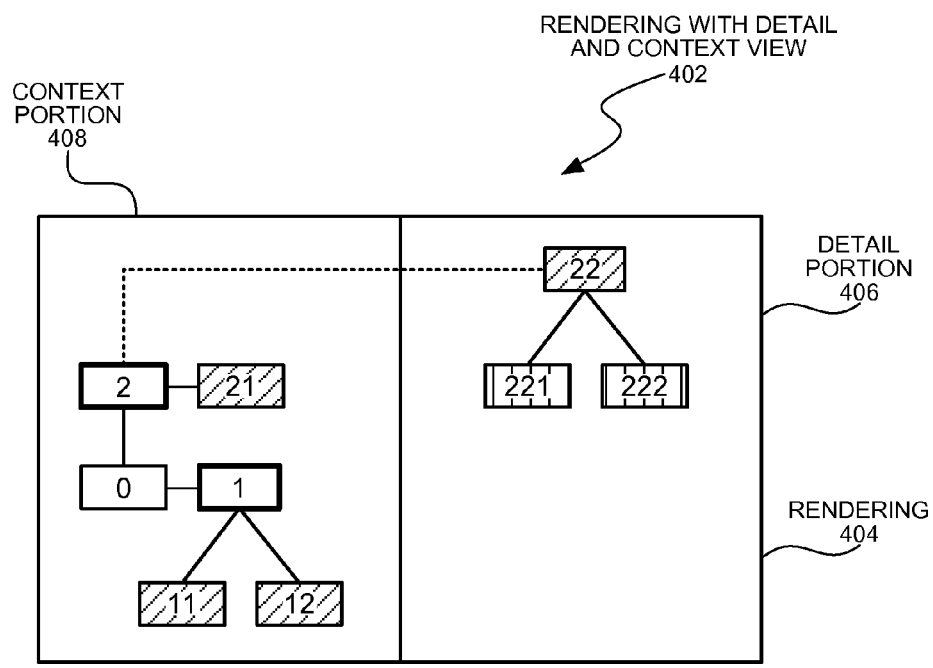
FIG. 4B is a diagram illustration of an example embodiment showing the hierarchical dataset of FIG. 4A displayed in a zipper tree format.

FIGS. 4A and 4B are a diagram illustration of embodiments showing a conventional dataset displayed with a detail portion and context portion.

FIG. 4A illustrates embodiment 400 showing an example dataset.

FIG. 4B illustrates the dataset of embodiment 400 as rendered into a rendering 404. The rendering 404 may be divided into a detail portion 406 and a context portion 408.

Node 22 is displayed as the current focus node in the detailed portion 406. The detailed portion 406 may display node 22 as the root node of the hierarchy, with nodes 221 and 222 as the child nodes of node 22.

Node 22 is displayed as connected to the context portion 408 by a dotted line to form a zipper tree. The zipper tree shows the hierarchy of nodes 2 and 0, each of which has child nodes, which the user may traverse using the climb/dive user input. The zipper tree of the context portion 408 may show the context of the focus node 22.

The zipper tree may show a truncated portion of a hierarchical dataset arranged from the standpoint of a focus node. The zipper tree may use color, typography, or other indicators to show items at the same level in the hierarchy in some embodiments.

The rendering 404 may illustrate a second mechanism for displaying and navigating a hierarchical dataset.

Figure 5:
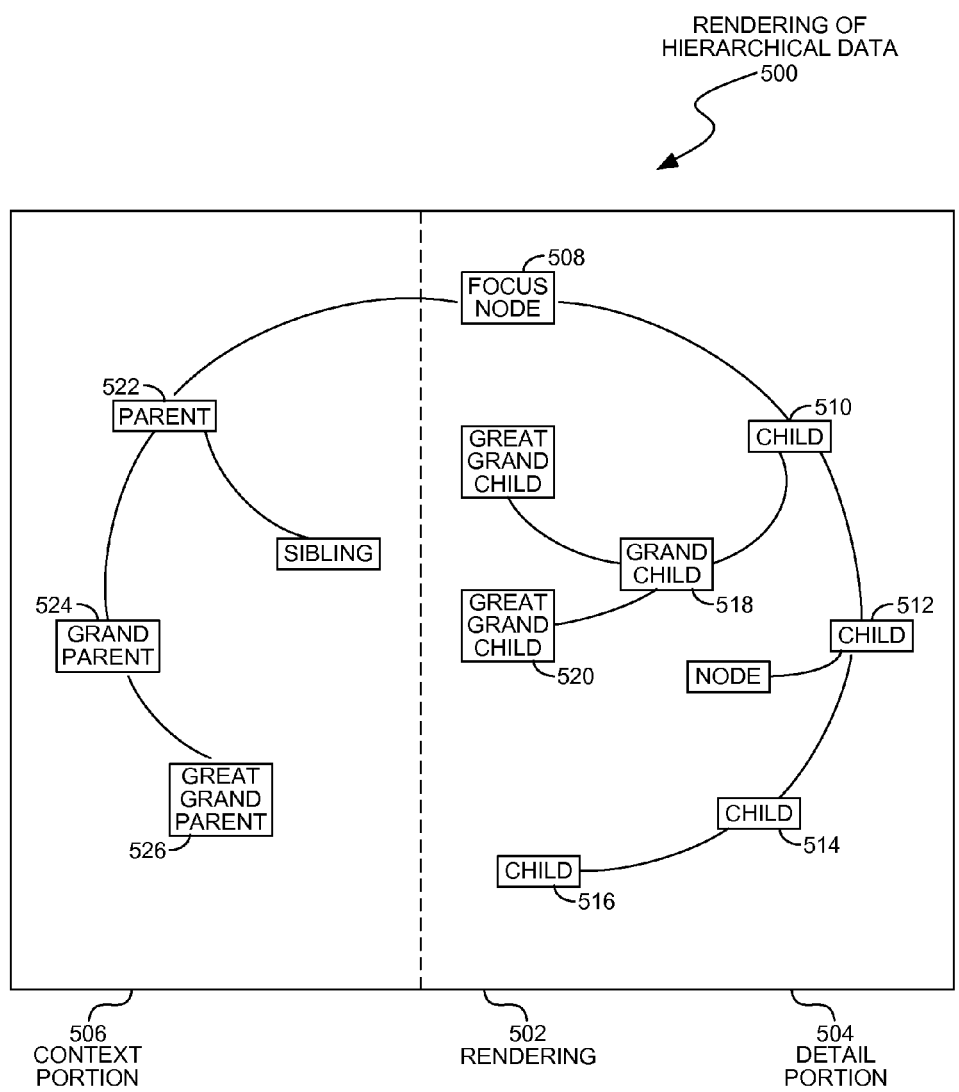
FIG. 5 is a diagram illustration of an example embodiment showing a hierarchical dataset displayed in a frond-like arrangement.

FIG. 5 is a diagram illustration of an example embodiment 500 showing yet another mechanism for displaying and navigating a hierarchical dataset.

Embodiment 500 illustrates a rendering 502 that has a detailed portion 504 and context portion 506. The hierarchical dataset is illustrated with a focus node 508 and various other nodes in frond-type arrangement.

Rendering 502 may show the hierarchical dataset in a frond-type arrangement where each set of similar edges are arranged using a set of nested golden rectangles that approximate a golden spiral or some other structure. Some such structures may be recursive, such as successively smaller spirals, successively smaller rectangles, or some other structure. Still other embodiments may use other display techniques.

For example, the focus node 508 and its child nodes 510, 512, 514, and 516 may be arranged in a golden spiral, with each node having decreasing size along the spiral. The golden spiral continuously spirals inside itself and goes on infinitely. As such, the representation of embodiment 500 may allow for an infinite number of child nodes within a single rendering, although some child nodes may become so small as to be unreadable.

The golden spiral or other recursive structure may also be applied to children of child nodes. For example, the child nodes 518 and 520 of node 510 may also be arranged using a golden spiral.

Similarly, a golden spiral may be used to arrange nodes on the context portion 506. Nodes with a parent/child relationship 522, 524, and 526 may be arranged in a golden spiral.

The rendering 502 may be navigated using climb/dive and spin inputs. A climb/dive input may traverse the dataset upwards towards the parent node 522 or downwards towards the child node 510. A spin input may cycle through the child nodes 510, 512, 514, and 516 in succession.

Figure 6:
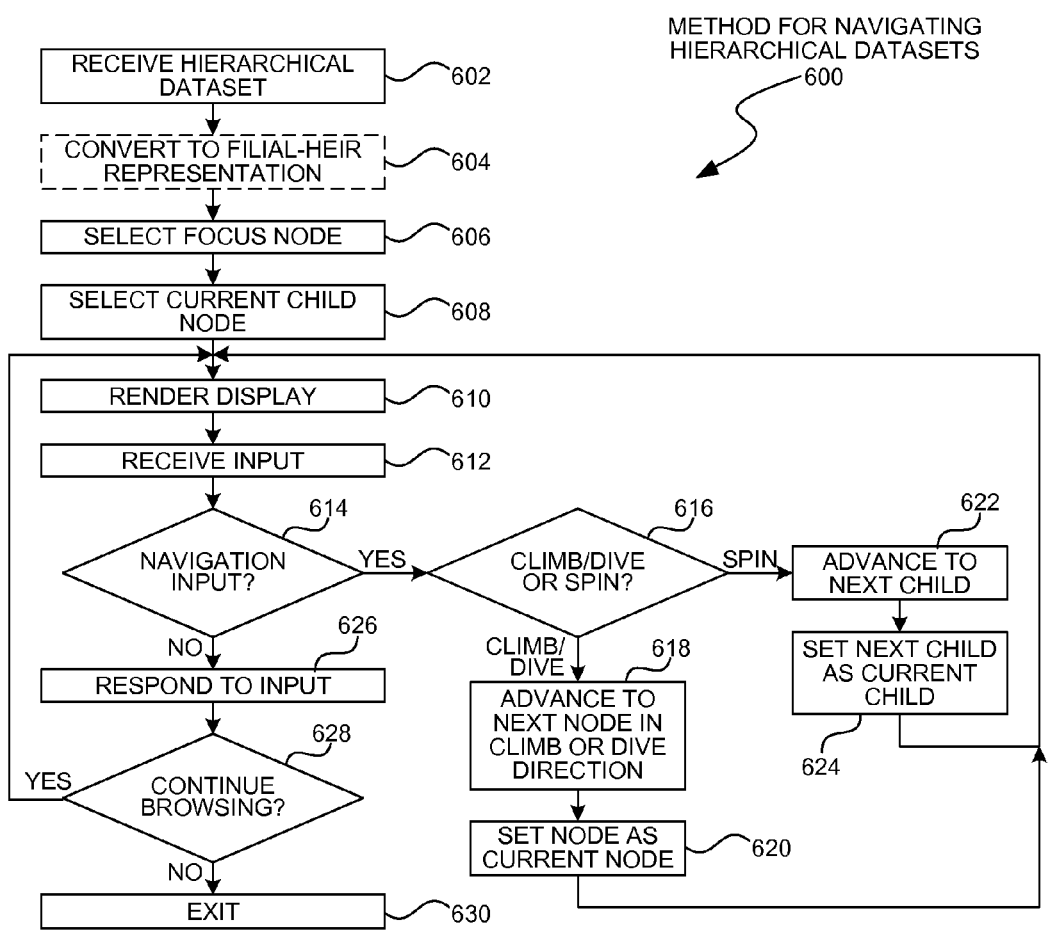
FIG. 6 is a flowchart of an embodiment showing a method for displaying and navigating a hierarchical dataset.

FIG. 6 is a flowchart illustration of an embodiment 600 showing a method for displaying and navigating hierarchical datasets.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

A hierarchical dataset may be received in block 602. In some embodiments, the hierarchical dataset may be converted to a filial-heir representation in block 604. Some embodiments may create a separate filial-heir representation of the dataset while other embodiments may not create any filial-heir representation.

A focus node may be selected in block 606 and a current child node may be selected in block 608. The current child node may be the first child node for the given focus node.

The display may be rendered in block 610 and displayed to a user.

A user input may be received in block 612. If the input is a navigation input in block 614, the navigation direction may be determined in block 616.

When the navigation direction is a climb or dive input in block 616, the next node in the climb or dive direction may be selected in block 618. The selected node may be set as the current node in block 620, and the process may return to block 610 to render the display.

When the navigation direction is a spin input in block 616, the next child node may be advanced in block 622 and set as the current child node in block 624. The process may return to block 610 to render the display.

If the input is not a navigation input in block 614, the input may be responded to in block 626. A typical non-navigation input may be to view data associated with the node, follow a link on the node, or perform some other function with the data associated with the node. After processing the input in block 626 the user may wish to continue browsing in block 628, which may return the process to block 610. Otherwise, the process may end in block 630.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
   receiving a hierarchical dataset;
   selecting a first focus node as a current focus node;
   selecting a first child node as a current child node;
   navigating said hierarchical dataset using a navigation mechanism configured to automatically traverse a binary tree structure of a binary tree representation of the hierarchical dataset, by:
   receiving a climb/dive input from a user and automatically navigating to a first node having a parent/child relationship to said current focus node, said first node being made a second focus node and setting said second focus node as said current focus node;
   receiving a spin input from a user and automatically navigating to a third node having a sibling node relationship to said current child node, and setting said third node as said current child node, the spin input instructing the navigation mechanism to automatically navigate across sibling nodes that are child nodes of said current focus node, the automatic navigation based on the binary tree structure, the sibling nodes having single edge connections between adjacent pairs of sibling nodes, for the automatic traversal of the binary tree structure; and
   rendering said hierarchical dataset with said current focus node and said current child node, including presenting a context portion of said hierarchical dataset, said context portion representing at least a portion of a zipper tree.

2. The method of claim 1, wherein at least a portion of said hierarchical dataset is arranged as a filial-heir tree.

3. The method of claim 1 further comprising:
   displaying said hierarchical dataset with said current focus node as a highlighted node.

4. The method of claim 3, said hierarchical dataset being displayed with the context portion and a detailed portion.

5. The method of claim 4, said context portion comprising a portion of said hierarchical dataset being higher level nodes than said current node.

6. The method of claim 5, said detailed portion comprising a portion of said hierarchical dataset being lower level nodes than said current node.

7. The method of claim 6, said detailed portion comprising a portion of said hierarchical dataset comprising sibling nodes to said current child node.

8. The method of claim 4, said context portion and said detailed portion being the same size.

9. The method of claim 4, said detailed portion being larger than said context portion.

10. The method of claim 3 further comprising:
    animating a transition from said first focus node to said second focus node when said second focus node is set as said current focus node.

11. A system comprising:
    a renderer configured to be executed by a computer processor, said renderer that:
    receives a hierarchical dataset; and
    renders said hierarchical dataset with a first focus node as a current focus node and a first child node as a current child node;
    a navigation mechanism, configured to automatically traverse a binary tree structure of a binary tree representation of the hierarchical dataset, that:
    receives input from a user input device, said input comprising an climb/dive input and a spin input;
    after receiving a climb/dive input, said navigation mechanism automatically navigates to a second node having a parent/child relationship to said current focus node and sets said second node as said current focus node;
    after receiving a spin input, said navigation mechanism automatically navigates to a third node having a sibling relationship to said current child node and sets said third node as said current child node, the spin input instructing the navigation mechanism to automatically navigate across sibling nodes that are child nodes of said current focus node, the automatic navigation based on the binary tree structure, the sibling nodes having single edge connections between adjacent pairs of sibling nodes, for the automatic traversal of the binary tree structure;
    after receiving said input and changing said current focus node, causes said renderer to render said hierarchical dataset with said current focus node, including presenting a context portion of said hierarchical dataset, said context portion based on at least a portion of a zipper tree.

12. The system of claim 11, said renderer that animates transitions when said current focus node is changed.

13. The system of claim 12, said renderer that animates transitions while said input is being received.

14. The system of claim 13, said renderer that renders said hierarchical dataset in a detail portion and the context portion.

15. The system of claim 14, said hierarchical dataset being stored, at least partially, in the binary tree data structure.

16. The system of claim 15, said binary tree data structure being a filial-heir data representation of a hierarchical tree.

17. A method comprising:
receiving a hierarchical dataset, said hierarchical dataset being a binary tree;
selecting a first focus node as a current focus node;
selecting a first child node as a current child node, said first child node being a child of said first focus node;
rendering said hierarchical dataset using said first focus node as said current focus node and said first child node as said current child node;
navigating said hierarchical dataset using a navigation mechanism configured to automatically traverse the binary tree structure, by:
receiving a climb/dive input from a user and automatically navigating to a first node having a parent/child relationship to said current focus node, said first node being made a second focus node and setting said second focus node as said current focus node;
receiving a spin input from a user and automatically navigating to a third node having a sibling node relationship to said current child node, and setting said third node as said current child node, the spin input instructing the navigation mechanism to automatically navigate across sibling nodes that are child nodes of said current focus node, the automatic navigation based on the binary tree structure, the sibling nodes having single edge connections between adjacent pairs of sibling nodes, for the automatic traversal of the binary tree structure; and
rendering said hierarchical dataset with said current focus node and said current child node, including presenting a representation of at least a portion of a zipper tree.

18. The method of claim 17, said binary tree being a filial-heir representation of a hierarchical dataset.

19. The method of claim 18, said rendering comprising presenting a context portion of said hierarchical dataset, said context portion including the at least a portion of the zipper tree.

20. The method of claim 19, said rendering comprising a detail portion.

* * * * *